(12) United States Patent
Eftekhari et al.

(10) Patent No.: US 10,877,265 B2
(45) Date of Patent: Dec. 29, 2020

(54) CAMERA WITH HEATING ARRANGEMENT, AND METHOD OF HEATING A CAMERA VIEWING WINDOW

(71) Applicant: Axis AB, Lund (SE)

(72) Inventors: Helen Eftekhari, Lund (SE); Linn Egelberg, Lund (SE); Mikael Persson, Lund (SE); Göran Lindfors, Lund (SE)

(73) Assignee: Axis AB, Lund (SE)

( * ) Notice: Subject to any disclaimer, the term of this patent is extended or adjusted under 35 U.S.C. 154(b) by 138 days.

(21) Appl. No.: 16/245,859

(22) Filed: Jan. 11, 2019

(65) Prior Publication Data

US 2019/0227304 A1 Jul. 25, 2019

(30) Foreign Application Priority Data

Jan. 19, 2018 (EP) .................................... 18152539

(51) Int. Cl.
| | |
|---|---|
| *G02B 27/00* | (2006.01) |
| *G03B 17/55* | (2006.01) |
| *G03B 17/04* | (2006.01) |
| *H05B 3/84* | (2006.01) |
| *H05B 3/86* | (2006.01) |

(52) U.S. Cl.
CPC ......... *G02B 27/0006* (2013.01); *G03B 17/04* (2013.01); *G03B 17/55* (2013.01); *H05B 3/84* (2013.01); *H05B 3/86* (2013.01)

(58) Field of Classification Search
CPC ......... G02B 27/006; G03B 17/55; H05B 3/84
USPC .......................................... 359/512; 219/202
See application file for complete search history.

(56) References Cited

U.S. PATENT DOCUMENTS

| | | | |
|---|---|---|---|
| 4,584,721 A | 4/1986 | Yamamoto | |
| 7,731,373 B2* | 6/2010 | Oskarsson | ........ B32B 17/10385 |
| | | | 359/512 |
| 7,965,336 B2 | 6/2011 | Bingle et al. | |
| 9,395,538 B2* | 7/2016 | Hui | ........................ H04N 5/2251 |
| 2002/0067424 A1 | 6/2002 | Brunner, Jr. | |
| 2006/0139483 A1* | 6/2006 | Jung | ..................... H04N 5/2257 |
| | | | 348/373 |
| 2011/0115972 A1 | 5/2011 | Voges | |

(Continued)

FOREIGN PATENT DOCUMENTS

| | | |
|---|---|---|
| CN | 206302593 U | 7/2017 |
| DE | 102016107545 A1 | 10/2017 |

OTHER PUBLICATIONS

EP 18152539.5 Extended European Search Report (dated Jul. 13, 2018).

*Primary Examiner* — Ricky D Shafer
(74) *Attorney, Agent, or Firm* — Volpe Koenig

(57) ABSTRACT

A camera comprising a movable camera head, a transparent viewing window through which the camera head is arranged to capture images, and a heating arrangement for heating the viewing window is disclosed. The viewing window comprises an electrical conductor. The heating arrangement comprises an electrical contact device for contacting the conductor and applying an electric current to the conductor in a portion of the viewing window, thereby heating the conductor in the portion of the viewing window, and a movement device for movement of the heating arrangement in coordination with a movement of the camera head. A method of heating a viewing window of a camera is also disclosed.

15 Claims, 4 Drawing Sheets

(56) References Cited

U.S. PATENT DOCUMENTS

| | | | | |
|---|---|---|---|---|
| 2012/0000024 A1* | 1/2012 | Layton | ................... | H04N 5/225 15/97.1 |
| 2012/0170119 A1* | 7/2012 | Chu | ....................... | G03B 11/00 359/512 |
| 2012/0243093 A1* | 9/2012 | Tonar | ..................... | G03B 17/08 359/507 |
| 2018/0017785 A1* | 1/2018 | Bulgajewski | ............ | G02B 1/18 |

\* cited by examiner

CAMERA WITH HEATING ARRANGEMENT, AND METHOD OF HEATING A CAMERA VIEWING WINDOW

FIELD OF INVENTION

The present teachings relate to a camera having a heating arrangement for heating a viewing window of the camera. It also relates to a method of heating a viewing window of a camera.

BACKGROUND

When cameras, and particularly monitoring cameras, are used outdoors, they are subject to environmental factors such as cold and moisture. In cold weather, ice may form on a viewing window of a monitoring camera, thereby obscuring or blocking the view of the camera. In order to prevent formation of ice, or to remove ice that has formed, a camera may be provided with a built-in heater or fan. Such a heater or fan may be dedicated to heating just the viewing window, or it may be used for heating the entire camera housing. Heaters and fans may also be used for preventing dew formation on the viewing window in moist environments.

An example of a camera housing provided with a fan may be found in U.S. Pat. No. 6,061,087. In this example, two fans are arranged in the camera housing for establishing a circulating air flow pattern around the monitoring camera.

Other cameras have heaters similar to the ones used for heating rear windows of cars. These may be made of thin, electrically conductive threads attached to the window. When current is applied to the threads, the threads heat up, and thereby also heat the window. Other cameras, such as the one described in U.S. Patent Publication No. 2011/0115972, have a coating applied to the surface of the window. Similar to the previously mentioned threads, the coating is electrically conductive and may thus be heated by application of current.

A problem with the known solutions is that they may be either bulky or highly energy consuming, or both. Fans take up space, and are difficult to fit inside a small camera housing. Additionally, they have movable parts that wear with use and may need to be replaced during the life of the camera. Further, heating the viewing window using threads or layers attached to the window requires a lot of electric power, thereby increasing the total power consumption of the camera. This may be problematic especially for cameras powered by Power over Ethernet (PoE), as there are limits to how much power can be provided under the PoE standards. Heating may require a lot of power particularly in cameras with relatively large viewing windows. This is the case, for example, in cameras having several camera heads arranged in one camera housing and inside one dome or viewing window, such as panoramic monitoring cameras. Examples of such cameras are the Q6000-E and P3707-PE marketed by the Applicant's daughter company Axis Communications AB.

SUMMARY

An object of the present teachings is to provide a camera in which heating of the viewing window may be performed energy efficiently. Another object is to provide a camera in which heating of the window does not require a bulky heater or fan. It is also an object of the present teachings to provide an energy efficient method of heating a viewing window of a camera.

According to a first aspect, these and other objects are achieved, in full or at least in part by a camera comprising: a movable camera head, a transparent viewing window through which the camera head is arranged to capture images, and a heating arrangement for heating the viewing window, wherein the viewing window comprises an electrical conductor, and the heating arrangement comprises: an electrical contact device for contacting the conductor and applying an electric current to the conductor in a portion of the viewing window, thereby heating the conductor in the portion of the viewing window, and a movement device for movement of the heating arrangement in coordination with a movement of the camera head. With such a camera, it is possible to heat a portion of the viewing widow, without having to heat the entire viewing window. In this manner, total power consumption of the camera may be reduced. Further, available power may be used for other needs in the camera, such as for image processing. By making the heating arrangement movable in coordination with the camera head, it is possible to ensure that the portion of the viewing window through which the camera head is to capture images is heated for preventing formation of ice or dew, or for removal of ice or dew that has formed on the viewing window. It should be noted that although reference is made to dew and dew formation, condensation of any liquid, not just water, may be prevented or removed in the same way. Still, this will be referred to as dew and dew formation throughout this description.

As used herein, the term "viewing window" may refer to a planar viewing window, as well as a curved viewing window, such as a dome of, for example, spherical, semi spherical, annular or toroidal shape.

By the term "portion of the viewing window" is meant a portion which is smaller than the entire viewing window.

The conductor may be a conductive layer applied on the viewing window. By applying a conductive layer on the viewing window, it may easily be ensured that a portion of the viewing window at any given location may be heated. The conductive layer may be formed in numerous ways, for example, as a film attached to a surface of the viewing window or as a coating applied on a surface of the viewing window. It may also be formed as a layer in the material of the viewing window.

The conductive layer may be applied on an inside of the viewing window. In this manner, the conductive layer may be protected from environmental factors, such as rain, snow and dust. Further, the conductive layer may be protected from vandalism and from damage by, for example, perching birds or cleaning tools. Additionally, the heating arrangement may also efficiently be arranged protected inside the viewing window.

In some embodiments, the conductive layer is a coating. The coating may be applied in any suitable way, such as painting, spraying, sputter deposition, or vacuum metalizing. A coating may be applied in a production efficient manner, and may adapt to any shape of the viewing window.

The coating may comprise indium tin oxide. Indium tin oxide, or ITO for short, is a widely used transparent coating. It is a good electrical conductor and is optically transparent. ITO is reflective to a large part of the infrared spectrum, but is transparent to near-infrared radiation (NIR). It is therefore suitable as a coating for digital cameras, as the image sensors used are generally sensitive not only to visible light, but also to NIR, making it possible to capture images also in low light.

In some embodiments, the electrical contact device comprises two flexible contact bars arranged to be applied on a surface of the viewing window, defining between them the portion of the viewing window. By using flexible contact bars, it is possible to ensure a good contact between the viewing window and the contact bars when mounting the viewing window on the housing. Further, flexibility of the contact bars reduces the risk of scratching a conductive layer on the viewing window.

The movement device may comprise a frame which carries the electrical contact device and which is attached to a holder holding the camera head. This may provide a mechanically simple way of ensuring that the heating arrangement may be moved with the camera head, such that a portion of the viewing window in front of the camera head may be heated.

In some embodiments, the camera further comprises a temperature sensor arranged to sense a temperature of the viewing window. A temperature sensor makes it possible to ascertain when heating is needed and when heating may be switched off.

The camera may comprise two or more camera heads and a respective heating arrangement associated with each camera head. Such cameras generally have a large viewing window, and therefore power savings may be made by heating only a portion of the viewing window at the capturing position of each camera head.

In some embodiments, the camera heads are movable in a panning direction. Such cameras may be used for capturing panoramic images of a monitored scene.

According to a second aspect, the abovementioned objects are achieved, in full or at least in part, by a method of heating a viewing window of a camera, the camera comprising a movable camera head, and a heating arrangement for heating the viewing window, wherein the viewing window is transparent and comprises an electrical conductor, and the heating arrangement comprises: an electrical contact device for contacting the conductor, and a movement device for movement of the heating arrangement in coordination with a movement of the camera head, the method comprising: moving the camera head to a capturing position, moving the heating arrangement to the capturing position, and applying an electric current to the conductor in a portion of the viewing window at the capturing position, thereby heating the conductor in the portion of the viewing window at the capturing position. In this manner, it is possible to heat the viewing window of a camera in an energy efficient way, as only a portion of the viewing window at the capturing position needs to be heated, rather than the entire viewing window. Further, such a method does not require any fan taking up a valuable part of the scarce space inside the camera housing.

The step of moving the heating arrangement may be performed by moving the camera head or vice versa. In this manner, it is possible to ensure that the heating arrangement is correctly placed for heating the viewing window at the capturing position.

The method may further comprise sensing a temperature of the viewing window, comparing the sensed temperature to a first temperature threshold, and if the sensed temperature is below the first temperature threshold, applying the electric current to the conductor. Depending on how the first temperature threshold is set, it is hereby possible to switch the heating arrangement on when the temperature is close to freezing, such that ice formation may be prevented, or to turn the heating arrangement on when the temperature is already below freezing, such that ice may be melted away. Similarly, the first temperature threshold may be set such that dew formation may be avoided or such that dew may be removed.

In some variants, the method further comprises sensing a temperature of the viewing window, comparing the sensed temperature to a second temperature threshold, and if the sensed temperature is above the second temperature threshold, interrupting application of the electric current to the conductor. The second temperature threshold may be chosen such that heating of the position of the viewing window may be switched off when the temperature of the viewing window is above a temperature where there is a risk of ice formation or dew formation. In this manner, power may be saved by not heating the viewing window for unnecessarily long periods of time. Further, once the viewing window has reached a temperature necessary for removing or preventing ice or dew, continued heating may risk damaging the camera or distorting the captured images.

A further scope of applicability of the present teachings will become apparent from the detailed description given below. However, it should be understood that the detailed description and specific examples, while indicating embodiments of the present teachings, are given by way of illustration only, since various changes and modifications within the scope of the present teachings will become apparent to those skilled in the art from this detailed description.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding of the present teachings can be had from the following description, given by way of example in conjunction with the accompanying drawings where.

DETAILED DESCRIPTION

Figure 1:
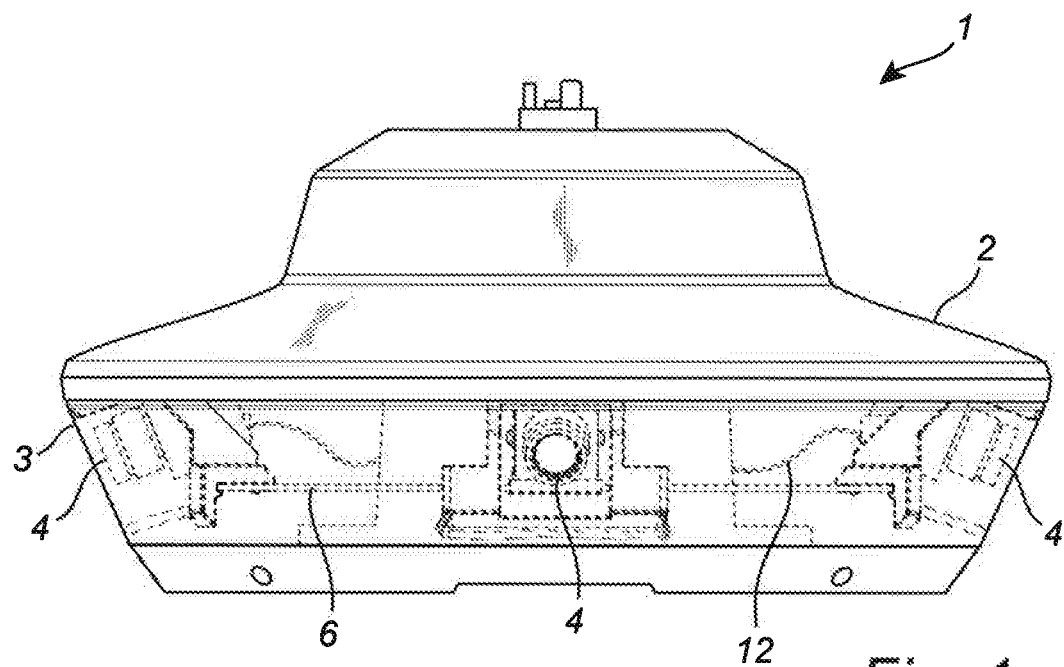
FIG. 1 is a perspective view of an embodiment of a camera.
Figure 2:
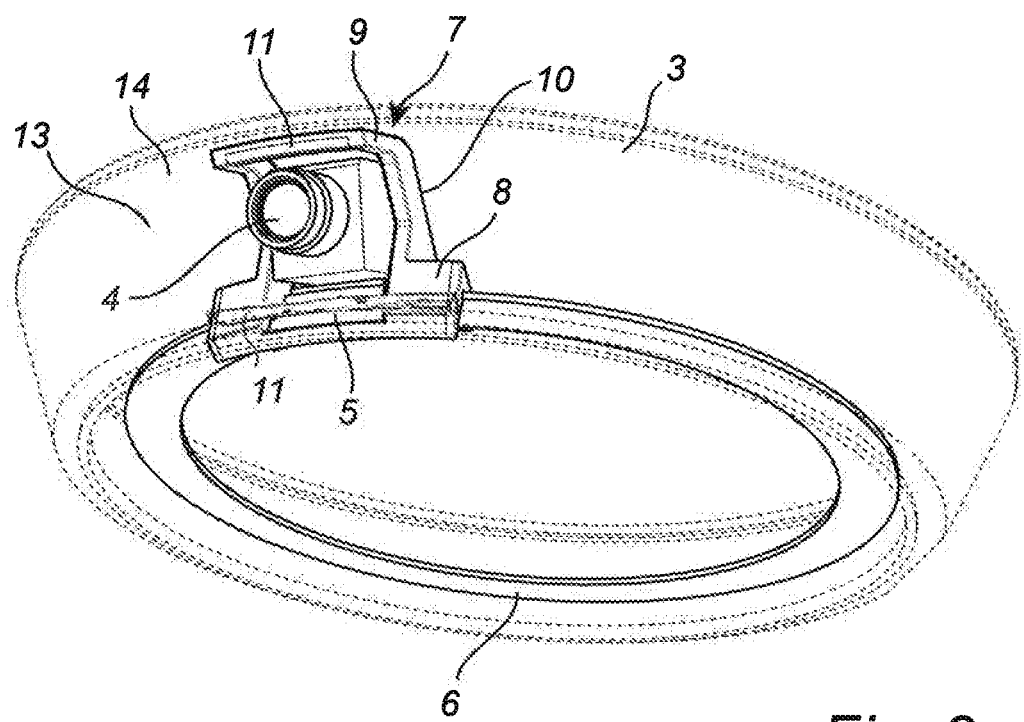
FIG. 2 is a perspective view of a viewing window and one camera head of the camera of FIG. 1 with a heating arrangement.

In FIG. 1, a camera 1 is shown. The camera 1 has a housing 2 and a generally annular viewing window 3. In the housing 2, inside the viewing window 3, four camera heads 4 are arranged (one of which is obscured at the back in FIG. 1). The viewing window 3 is transparent, such that the camera heads may capture images of the surrounding scene through the viewing window 3. Each camera head 4 is carried by a camera holder 5, which is arranged on a circular mounting rail 6, as may be seen in FIG. 2. In the interest of clarity, only one of the camera heads 4 is shown in FIG. 2. The camera holders 5, and thereby the camera heads 4, are movable along the mounting rail 6, such that at installation of the camera 1, each camera head 4 may be placed in a desired capturing position, making it possible to capture images of a desired part of the surrounding scene. For instance, the four camera heads 4 may be placed equidistantly around the mounting rail, such that they together may cover a 360° field of view. The camera heads may also be placed in other positions along the mounting rail as desired. For instance, there may be objects in the scene blocking the view, such that it is preferable to place the camera heads at other angular distances from each other. The camera holders 5 may be locked in place on the mounting rail, for example, by magnetic force, such as described in Applicant's European Patent No. 2887328. In this manner, the camera heads may easily be positioned in suitable positions during mounting of the camera, and they may then be securely held in those positions during operation.

Figure 3:
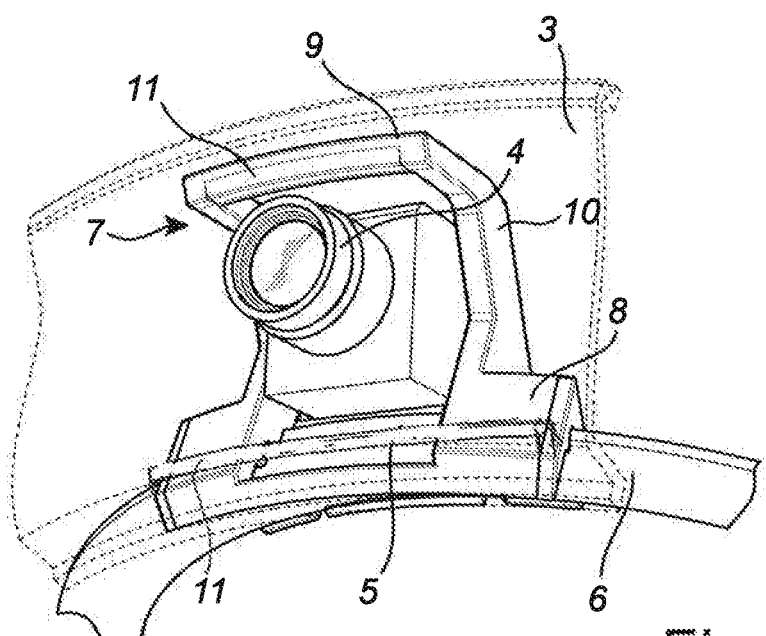
FIG. 3 is a perspective view of the camera head and heating arrangement of FIG. 2.
Figure 4:
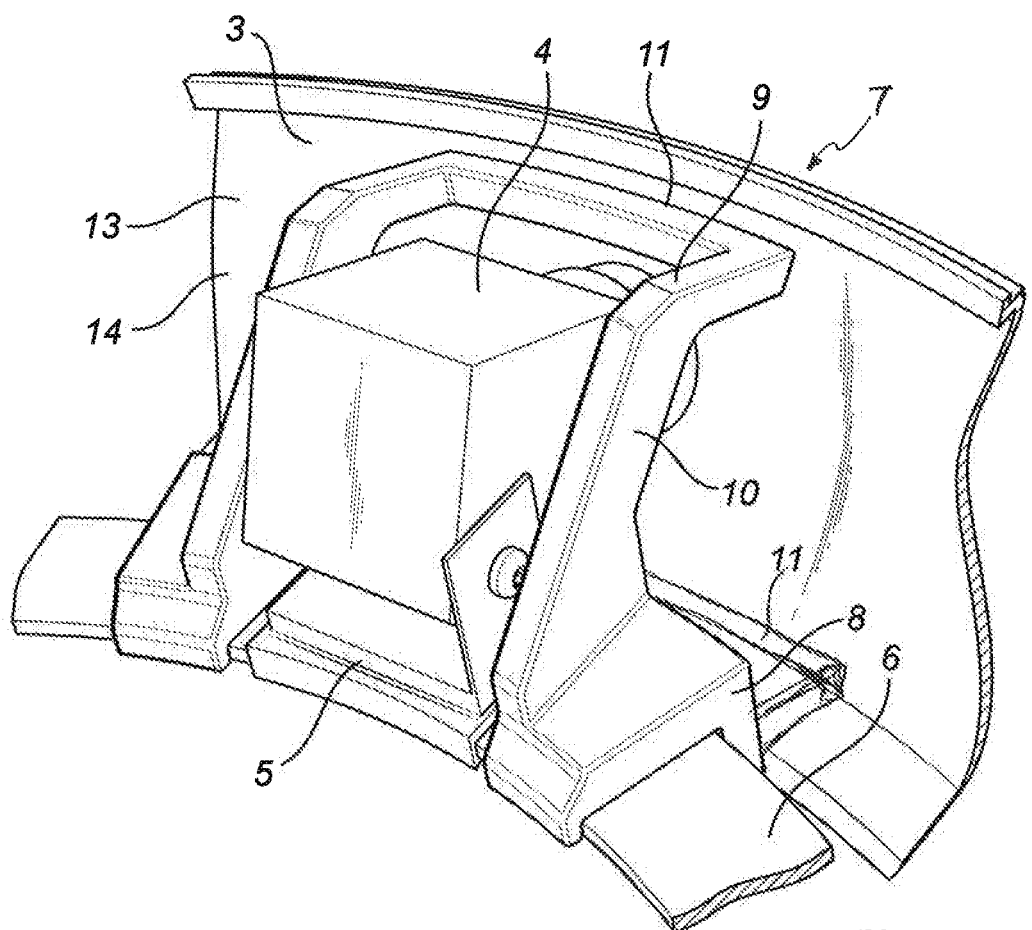
FIG. 4 is a perspective view of the camera head and heating arrangement of FIG. 3 seen from inside the viewing window.

On each camera holder 5, a heating arrangement 7 is arranged. This may be seen in closer detail in FIG. 3. The heating arrangement 7 has a movement device 8 making it possible to move the heating arrangement 7 as the camera head 4 is moved. By arranging the heating arrangement 7 on the camera holder 5 it is possible to move the heating arrangement 7 by moving the camera head 4 to a desired capturing position. It is also possible to do this vice versa, in other words, to move the camera head 4 by moving the heating arrangement 7. The heating arrangement 7 comprises an electrical contact device 9, which in this example takes the form of a frame 10 carrying two contact bars 11 arranged to be placed in contact with the inside surface of the viewing window 3. The contact bars 11 have a relatively rigid core, covered by a rubber or elastomeric layer providing flexibility, and an electrically conductive outer sleeve. Wiring 12 (indicated only in FIG. 1) is arranged for providing power from a power source (not shown) to the contact bars 11. The flexibility of the contact bars 11 makes it possible to achieve a good contact between the contact bars and the inside of the viewing window 3. Further, it reduces the risk of scratching the inside of the viewing window 3.

The viewing window comprises an electrical conductor 13. In the example shown in FIGS. 1-4, the electrical conductor 13 is a coating of ITO. The coating 13 covers essentially the entire inside surface of the viewing window. By supplying power to the contact bars 11, it is possible to apply a current to the coating 13 on a window portion defined between the contact bars 11. When current is applied to the coating ITO, resistance of the coating material will raise the temperature of the coating 13, and thereby also of the portion of the viewing window 3 which the coating 13 between the contact bars 11 covers. Hereby, it is possible to melt ice that has formed on the outside of the viewing window in front of the camera head 4, or to prevent such ice formation. It is also possible remove dew or to prevent dew formation.

The camera 1 shown in FIG. 1 is a panoramic camera having four camera heads 4. At installation of the camera 1, the camera heads 4 may be moved freely along the mounting rail 6 to desired capturing positions and locked in place. For instance, the four camera heads 4 may be placed 90° apart, thereby enabling a total 360° field of view, depending on the individual field of view of each camera head 4. The viewing window 3 is quite large, especially compared to the combined viewing window area taken up by the camera heads 4. It may therefore be inefficient energy-wise to heat the entire viewing window for removing or preventing ice or dew. The fact that each heating arrangement 7 is movable in coordination with the respective camera head 4 makes it possible to heat just a portion of the viewing window 3 at the capturing position. In this manner, energy may be saved. Further, ice or dew may be removed quicker locally than if the whole viewing window were to be heated on the same power budget.

Figure 5:
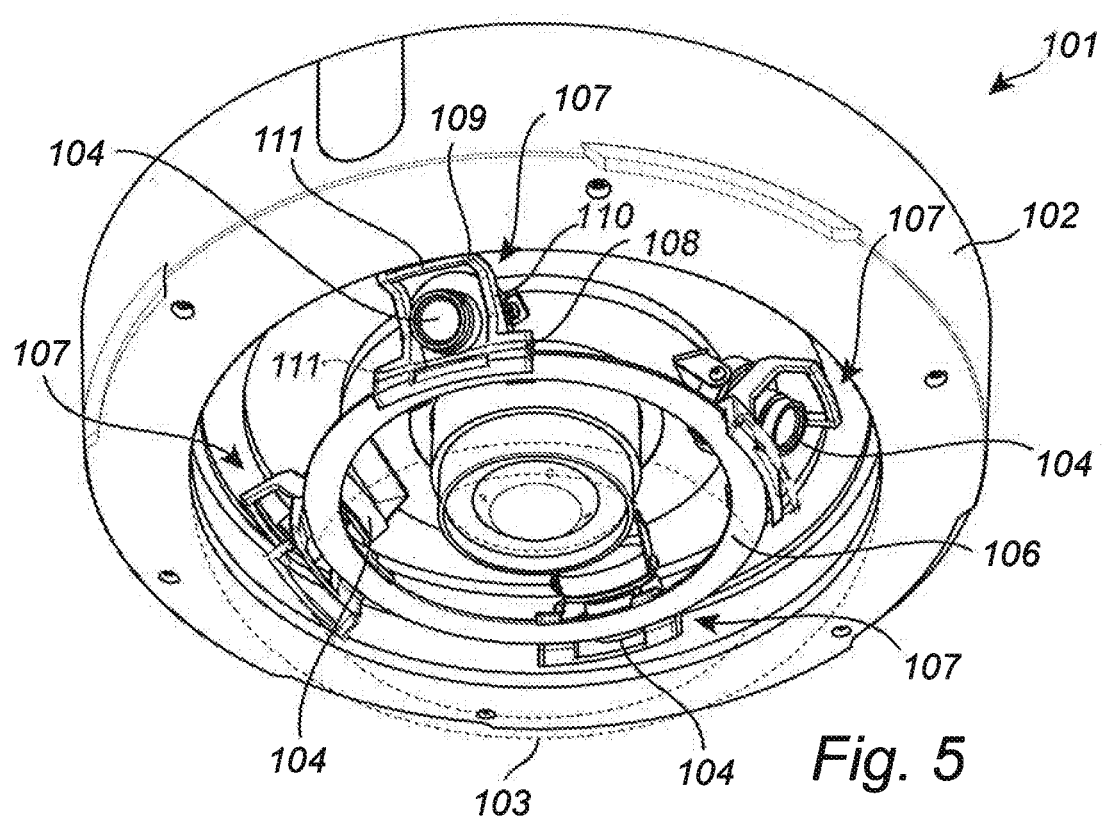
FIG. 5 is a perspective view of a second embodiment of a camera.
Figure 6:
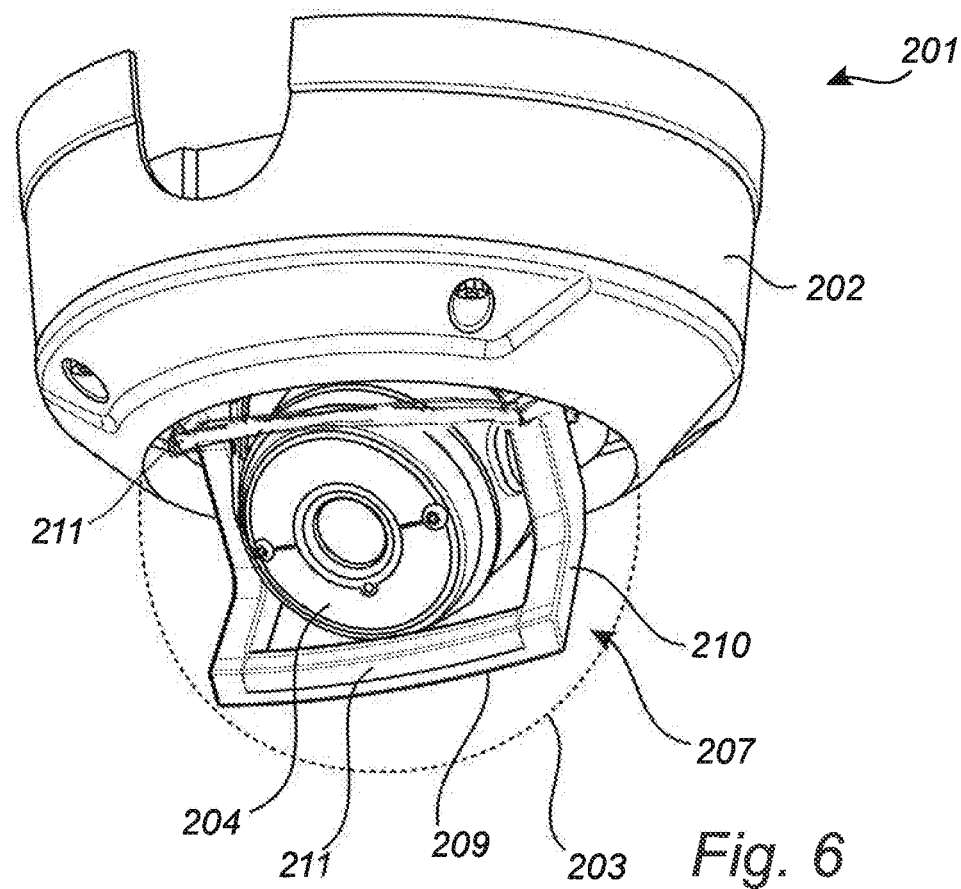
FIG. 6 is a perspective view of a third embodiment of a camera.

As may be seen in FIGS. 5 and 6, the same kind of heating arrangement may be used also for other types of cameras. FIG. 5 shows another panoramic camera 101, which has a viewing window that may be described as toroidal or donut-shaped. A viewing window or dome of this kind may be seen in Applicant's European Patent No. 3168819. In FIG. 5, the same reference numerals as in FIGS. 1-4 have been used, but with the addition of 100. Similar to what has been described above, the camera heads 104 may at installation of the camera 101 be moved to desired capturing positions and locked there for operation. Each heating arrangement 107 is moved with the respective camera head 104. By applying power to the contact bars 111, current may be applied to the coating 114 to heat the viewing window 103 locally at each capturing position.

FIG. 6 shows a camera 201 having a more commonly used dome of a generally semi spherical shape. In FIG. 6, the same reference numerals as in FIGS. 1-4 have been used, but with the addition of 200. The camera head 204 may in the same way as in the two previously described embodiments be movable by panning and tilting at installation for achieving a desired field of view. The heating arrangement 207 is moved in coordination with the camera head 204, such that current may be applied to the coating 214 in a portion of the viewing window 203 at the capturing position for heating.

Figure 7:
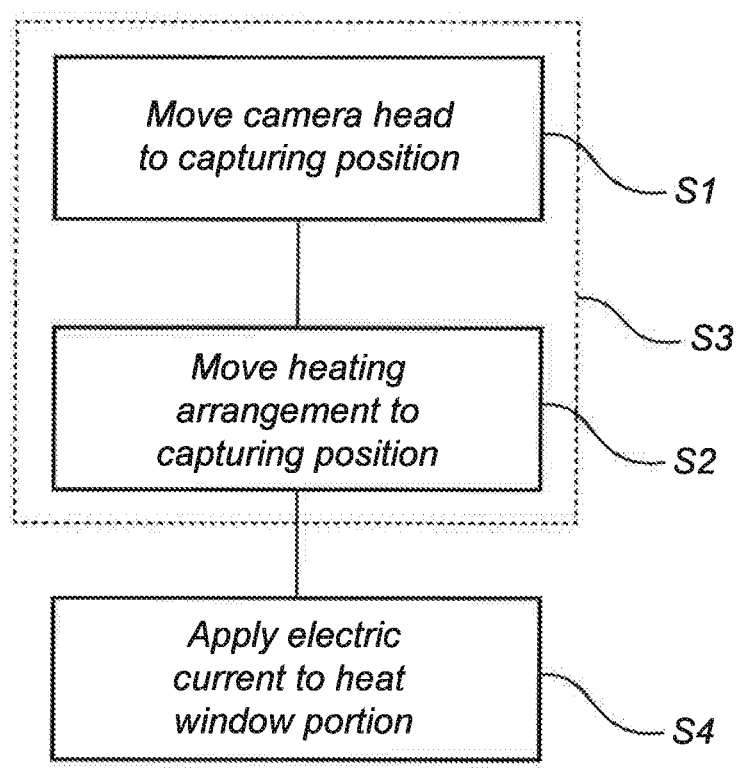
FIG. 7 is a flow chart showing a method of heating a viewing window of a camera.

With reference to FIG. 7, a method of heating a viewing window of a camera will now be described. This method may be used in any of the cameras 1, 101, 201 shown in the drawings, or in any other camera having a heating arrangement that is movable in coordination with a camera head of the camera.

At installation or at a later point in time, the camera head is moved to a capturing position (step S1). The heating arrangement is also moved to the capturing position (S2). In an embodiment, the camera head and the heating arrangement are moved together to the capturing position, such that these two steps S1, S2 may be joined together in a single step S3. Current is applied by the electrical contact device to the coating on the viewing window (S4). In this manner, the coating is heated, and thereby the portion of the viewing window at the capturing position is heated, such that ice or dew formation may be prevented, or such that ice or dew may be removed.

Optionally, the camera may be provided with a temperature sensor. The temperature of the viewing window may be sensed, such that it is possible to determine if heating is necessary. The sensed temperature may be compared to a first temperature threshold indicative of a risk of ice formation. For instance, the first temperature threshold may be set to 0° C. If the sensed temperature is below the first temperature threshold, application of current may be started, such that ice formation may be prevented or such that ice that has already been formed may be melted. It may also be desirable to determine when the heating may safely be switched off. To this end, a second temperature threshold may be set, which is indicative of little or no risk of ice formation. For instance, the second temperature threshold may be set to 1° C. The sensed temperature may be compared to the second temperature threshold, and if the sensed temperature is above the second temperature threshold, the heating arrangement may be switched off, such that current application ceases. In very cold weather, or when a thick layer of ice has formed on the viewing window, it may be impossible to supply enough power to the heating arrangement for preventing ice formation or melting ice already formed and at the same time supply enough power for normal operation of the camera. In such a situation, it may be necessary to switch off camera operation and use all available power for heating, possibly at one camera head at a time in a camera with multiple camera heads. In some instances, the camera head whose viewing window portion is being heated may be in operation, whereas the other camera heads are switched off. Once the viewing window has been sufficiently heated at the capturing position, as determined, for example, using the temperature sensor, normal camera operation may be resumed.

Similarly, the temperature sensor may be used for determining if heating for preventing or removing dew is needed, and for determining if such heating may be safely interrupted. When it comes to dew formation, it may also be necessary to arrange a hygrometer for determining air humidity.

It may also be possible for a user of the camera to manually switch heating on and off. Further, based, for example, on a weather forecast, a timer may be used for controlling the heating. Image analysis may also be used for determining if there is ice or dew on the viewing window, and heating may be switched on automatically when such an event is detected. Similarly, heating may be switched off when image analysis indicates that there is no longer any ice or dew on the viewing window.

It will be appreciated that a person skilled in the art can modify the above described embodiments in many ways and still use the advantages of the present teachings as shown in the embodiments above. As an example, another material may be used for the coating. It would, for instance, be possible to use a doped binary compound, such as aluminium-doped zinc oxide, indium-doped zinc oxide, gallium-doped zinc oxide, or indium-doped cadmium oxide. It may also be possible to use a coating of carbon nanotubes. Further, a film of graphene may be used. Conductive polymers may also be used. These generally have a lower conductivity, but are less expensive than many other alternatives.

Electrically conducting threads may instead be attached to a surface of the viewing window, similar to what is commonly used on rear windows of cars.

Rather than a film or coating covering a surface of the viewing window, or threads attached to a surface of the viewing window, particles of an electrically conductive material may be embedded in the material of the viewing window. A balance must here be struck between the desire to make the viewing window electrically conducting and a risk of lowering impact resistance of the viewing window, particularly if the camera is to be used where there is a risk of vandalism. If the conductor is embedded in the viewing window material, the electrical contact device needs to be adapted, as it may not be possible to achieve direct electrical contact with the conductor. In such case, induction may be used. Induction may be useful also if direct contact with the viewing window is undesirable, such as in a PTZ camera, where the camera head in many situations moves frequently and quickly.

A slightly different approach, which is outside the scope of the present teachings, would be to use not an electrical conductor in or on the viewing window, but a thermal conductor. IR absorbing particles could be embedded in the viewing window material, and a movable heating arrangement in the form of an IR emitter could be used for heating the IR absorbing particles and thereby a portion of the viewing window at the capturing position.

As discussed above, the coating may be applied by sputter deposition. However, depending on the material used, it may also be possible to paint or spray the coating on the viewing window, or to apply the coating by, for example, tape casting, laser sintering, or electron beam evaporation.

In the embodiments described above, the coating is on the inside of the viewing window, and so is the heating arrangement. In this manner, the coating and the heating arrangement are protected inside the camera housing. It is, however, also possible to have the coating or film, as well as the heating arrangement, on the outside of the viewing window. This may for instance be desirable if the camera housing is small and does not have room for the heating arrangement. It may also be an advantageous alternative if an existing camera is to be retrofitted with a film or coating and a heating arrangement. Permutations are also possible in which the coating or film is on the inside of the viewing window and the heating arrangement is on the outside, or vice versa. If the electrical conductor and the heating arrangement are not on the same side of the viewing window, direct electrical contact may be difficult to ascertain, and induction may be used instead. Still, it is also possible to have the film or coating on one side of the viewing window and to have conductive strips of material arranged at intervals along the edges of the viewing window and extending over the edges onto the other side of the viewing window for contact with the electrical contact device. It may here be noted that such an arrangement would be more useful in cameras having a viewing window with separate upper and lower edges, such as the annular viewing window in FIG. 1, than in cameras having a viewing window in the form of a continuous dome, such as in FIGS. 5 and 6.

The heating arrangement may be integrated in the camera holder, but it may also be removably attached to the camera holder or entirely separate from the camera holder. If the heating arrangement is removable, it may be removed if the camera is used in an environment where there is no need for heating, such as in a dry indoor environment. If the camera is later moved to another location, where heating is needed, the heating arrangement may be replaced. The heating arrangement may also be delivered separately for retrofitting or for mounting at installation of the camera.

The contact bars have been described as having a flexible layer of rubber or elastomeric material and being covered by an electrically conducting sleeve. They may as well be made of an electrically conductive rubber or elastomeric material.

In the embodiments described above, the camera heads are manually movable during installation. However, the cameras may also be motorised, such that the camera heads may be adjusted remotely at installation.

Although the present teachings may provide most advantage in the case of cameras having camera heads that are movable only at installation, where each camera head takes up just a part of the available viewing window area during operation, it may also be used to advantage in cameras having camera heads that are movable during operation.

Such cameras may be referred to as PT cameras or PTZ cameras depending on if they are capable of just panning and tilting (PT), or if they are additionally capable of zooming (PTZ). In such cameras, the present teachings may be of particular use if the camera head moves relatively slowly or infrequently, or if it is pointed in one particular direction more often than in other directions.

Thus, the present teachings should not be limited to the shown embodiments but should only be defined by the appended claims.

What is claimed is:

1. A camera comprising:
   a movable camera head;
   a transparent viewing window through which the camera head is arranged to capture images;
   a heating arrangement for heating the viewing window; and
   a movement device for movement of the heating arrangement in coordination with a movement of the camera head,
   wherein the viewing window comprises an electrical conductor, and
   wherein the heating arrangement comprises:
      an electrical contact device for contacting the conductor and applying an electric current to the conductor in a portion of the viewing window, thereby heating the conductor in the portion of the viewing window.

2. The camera of claim 1, wherein the conductor is a conductive layer applied on the viewing window.

3. The camera of claim 2, wherein the conductive layer is applied on an inside of the viewing window.

4. The camera of claim 2, wherein the conductive layer is a coating.

5. The camera of claim 4, wherein the coating comprises indium tin oxide.

6. The camera of claim 1, wherein the electrical contact device comprises two flexible contact bars arranged to be applied on a surface of the viewing window, defining between them the portion of the viewing window.

7. The camera of claim 1, wherein the movement device comprises a frame which carries the electrical contact device and which is attached to a holder holding the camera head.

8. The camera of claim 1, further comprising a temperature sensor arranged to sense a temperature of the viewing window.

9. The camera of claim 1, the camera comprising two or more camera heads and a respective heating arrangement associated with each camera head.

10. The camera of claim 9, wherein the camera heads are movable in a panning direction.

11. A method of heating a viewing window of a camera, the camera comprising a movable camera head, and a heating arrangement for heating the viewing window, wherein the viewing window is transparent and comprises an electrical conductor, and the heating arrangement comprises an electrical contact device for contacting the conductor, and a movement device for movement of the heating arrangement in coordination with a movement of the camera head, the method comprising:
   moving the camera head to a capturing position;
   moving the heating arrangement to the capturing position; and
   applying an electric current to the conductor in a portion of the viewing window at the capturing position, thereby heating the conductor in the portion of the viewing window at the capturing position.

12. The method of claim 11, wherein the moving the heating arrangement is performed by moving the camera head.

13. The method of claim 11, wherein the moving the camera head is performed by moving the heating arrangement.

14. The method of claim 11, further comprising:
   sensing a temperature of the viewing window;
   comparing the sensed temperature to a first temperature threshold; and
   if the sensed temperature is below the first temperature threshold, applying the electric current to the conductor.

15. The method of claim 11, further comprising:
   sensing a temperature of the viewing window;
   comparing the sensed temperature to a second temperature threshold; and
   if the sensed temperature is above the second temperature threshold, interrupting application of the electric current to the conductor.

* * * * *